US008622830B2

(12) United States Patent
Radek

(10) Patent No.: US 8,622,830 B2
(45) Date of Patent: Jan. 7, 2014

(54) CONTROLLING SOUND DISTRIBUTION IN WAGERING GAME APPLICATIONS

(75) Inventor: Paul J. Radek, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 475 days.

(21) Appl. No.: 12/860,467

(22) Filed: Aug. 20, 2010

(65) Prior Publication Data

US 2011/0045905 A1 Feb. 24, 2011

Related U.S. Application Data

(60) Provisional application No. 61/235,518, filed on Aug. 20, 2009.

(51) Int. Cl.
*A63F 13/00* (2006.01)

(52) U.S. Cl.
USPC .................................. 463/35; 463/30; 463/31

(58) Field of Classification Search
USPC ................................................ 463/30, 31, 35
See application file for complete search history.

(56) References Cited

U.S. PATENT DOCUMENTS 5,483,631 A 1/1996 Nagai et al.
5,633,993 A * 5/1997 Redmann et al. ............. 345/419
6,040,831 A * 3/2000 Nishida .......................... 715/727
6,081,266 A * 6/2000 Sciammarella ............... 715/727
6,146,273 A 11/2000 Olsen
6,647,119 B1 * 11/2003 Slezak ............................ 381/17
6,843,723 B2 1/2005 Joshi
6,939,226 B1 9/2005 Joshi
6,960,136 B2 11/2005 Joshi et al.
6,972,528 B2 12/2005 Shao et al.
6,974,385 B2 12/2005 Joshi et al.
6,991,543 B2 1/2006 Joshi
7,082,572 B2 7/2006 Pea et al.
7,112,139 B2 9/2006 Paz Barahona et al.
7,228,190 B2 6/2007 Dowling et al.

(Continued)

FOREIGN PATENT DOCUMENTS

WO WO2004086320 10/2001
WO WO2004075128 9/2004

(Continued)

OTHER PUBLICATIONS

U.S. Appl. No. 12/797,756, filed Jun. 10, 2010, Berry, Robert G., et al.

(Continued)

*Primary Examiner* — James S McClellan
(74) *Attorney, Agent, or Firm* — DeLizio Gilliam, PLLC

(57) ABSTRACT

A wagering game system and its operations are described herein. In some embodiments, the operations can include determining wagering game content presented in a computerized graphical interface on a wagering game machine display. The operations can further include determining sound content that is presentable via a plurality of audio production devices associated with a wagering game machine. The plurality of audio production devices can be positioned in relation to the wagering game machine display to produce a multi-directional audio field that originates from the wagering game content. The operations can determine a position of the computerized graphical interface in relation to the wagering game machine display. The operations can further control distribution of the sound content on the plurality of audio production devices based on the position of the computerized graphical interface on the wagering game machine display.

24 Claims, 10 Drawing Sheets

(56) References Cited

U.S. PATENT DOCUMENTS

| | | | |
|---|---|---|---|
| 7,364,508 | B2 | 4/2008 | Loose et al. |
| 7,367,886 | B2 | 5/2008 | Loose et al. |
| 7,449,839 | B1 | 11/2008 | Chen et al. |
| 7,479,063 | B2 | 1/2009 | Pryzby et al. |
| 7,666,091 | B2 | 2/2010 | Joshi et al. |
| 7,682,249 | B2 | 3/2010 | Winans et al. |
| 7,811,170 | B2 | 10/2010 | Winans et al. |
| 2002/0010018 | A1 | 1/2002 | Lemay et al. |
| 2002/0055978 | A1 | 5/2002 | Joon-Boo et al. |
| 2002/0160826 | A1 | 10/2002 | Gomez et al. |
| 2003/0007648 | A1 | 1/2003 | Currell |
| 2003/0017865 | A1 | 1/2003 | Beaulieu et al. |
| 2003/0130033 | A1 | 7/2003 | Loose |
| 2003/0132722 | A1 | 7/2003 | Chansky et al. |
| 2004/0072610 | A1 * | 4/2004 | White et al. .................... 463/20 |
| 2004/0160199 | A1 | 8/2004 | Morgan et al. |
| 2005/0043090 | A1 | 2/2005 | Pryzby et al. |
| 2005/0054440 | A1 | 3/2005 | Anderson et al. |
| 2005/0077843 | A1 | 4/2005 | Benditt |
| 2005/0116667 | A1 | 6/2005 | Mueller et al. |
| 2005/0128751 | A1 | 6/2005 | Roberge et al. |
| 2005/0164785 | A1 | 7/2005 | Connelly |
| 2005/0164786 | A1 | 7/2005 | Connelly |
| 2005/0164787 | A1 | 7/2005 | Connelly |
| 2005/0164788 | A1 | 7/2005 | Grabiec |
| 2005/0174473 | A1 | 8/2005 | Morgan et al. |
| 2005/0239545 | A1 | 10/2005 | Rowe |
| 2005/0248299 | A1 | 11/2005 | Chemel et al. |
| 2005/0275626 | A1 | 12/2005 | Mueller et al. |
| 2005/0277469 | A1 | 12/2005 | Pryzby et al. |
| 2005/0282631 | A1 | 12/2005 | Bonney et al. |
| 2006/0009285 | A1 | 1/2006 | Pryzby et al. |
| 2006/0022214 | A1 | 2/2006 | Morgan et al. |
| 2006/0046829 | A1 | 3/2006 | White |
| 2006/0076908 | A1 | 4/2006 | Morgan et al. |
| 2006/0253781 | A1 | 11/2006 | Pea et al. |
| 2007/0008711 | A1 | 1/2007 | Kim |
| 2007/0189026 | A1 | 8/2007 | Chemel et al. |
| 2007/0218970 | A1 | 9/2007 | Patel et al. |
| 2007/0218974 | A1 | 9/2007 | Patel et al. |
| 2007/0291483 | A1 | 12/2007 | Lys |
| 2007/0293304 | A1 | 12/2007 | Loose et al. |
| 2008/0039213 | A1 | 2/2008 | Cornell et al. |
| 2008/0070685 | A1 | 3/2008 | Pryzby et al. |
| 2008/0094005 | A1 | 4/2008 | Rabiner et al. |
| 2008/0113715 | A1 | 5/2008 | Beadell et al. |
| 2008/0113796 | A1 | 5/2008 | Beadell et al. |
| 2008/0161108 | A1 | 7/2008 | Dahl et al. |
| 2008/0176647 | A1 | 7/2008 | Acres |
| 2008/0231203 | A1 | 9/2008 | Budde et al. |
| 2008/0288607 | A1 | 11/2008 | Muchow |
| 2008/0309259 | A1 | 12/2008 | Snijder et al. |
| 2009/0009997 | A1 | 1/2009 | Sanfilippo et al. |
| 2009/0170597 | A1 | 7/2009 | Bone et al. |
| 2009/0197673 | A1 | 8/2009 | Bone et al. |
| 2009/0206773 | A1 | 8/2009 | Chang |
| 2009/0270167 | A1 | 10/2009 | Ajiro et al. |
| 2009/0298579 | A1 | 12/2009 | Radek et al. |
| 2009/0318223 | A1 | 12/2009 | Langridge et al. |
| 2010/0022298 | A1 | 1/2010 | Kukita |
| 2010/0029385 | A1 | 2/2010 | Garvey et al. |
| 2010/0031186 | A1 | 2/2010 | Tseng et al. |
| 2010/0075750 | A1 | 3/2010 | Bleich et al. |
| 2010/0113136 | A1 | 5/2010 | Joshi et al. |
| 2010/0171145 | A1 | 7/2010 | Morgan et al. |
| 2010/0213876 | A1 | 8/2010 | Adamson et al. |
| 2010/0277079 | A1 | 11/2010 | Van Der Veen et al. |
| 2010/0309016 | A1 | 12/2010 | Wendt et al. |
| 2010/0317437 | A1 | 12/2010 | Berry et al. |
| 2011/0035404 | A1 | 2/2011 | Morgan et al. |
| 2011/0050101 | A1 | 3/2011 | Bailey et al. |

FOREIGN PATENT DOCUMENTS

| | | |
|---|---|---|
| WO | WO2004075129 | 9/2004 |
| WO | WO2005113089 | 12/2005 |
| WO | WO2005114598 | 12/2005 |
| WO | WO2005114599 | 12/2005 |
| WO | WO2005117647 | 12/2005 |
| WO | WO2006017444 | 2/2006 |
| WO | WO2006017445 | 2/2006 |
| WO | WO2006033941 | 3/2006 |
| WO | WO-2006039284 | 4/2006 |
| WO | WO-2006039323 | 4/2006 |
| WO | WO-2006125013 | 11/2006 |
| WO | WO-2007022294 | 2/2007 |
| WO | WO-2007022343 | 2/2007 |
| WO | WO2007133566 | 11/2007 |
| WO | WO2008057538 | 5/2008 |
| WO | WO2008063391 | 5/2008 |
| WO | WO-2008137130 | 11/2008 |
| WO | WO-2009054930 | 4/2009 |
| WO | WO2010048068 | 4/2010 |
| WO | WO2011005798 | 1/2011 |
| WO | WO2011014760 | 2/2011 |

OTHER PUBLICATIONS

U.S. Appl. No. 12/965,749, filed Dec. 10, 2010, Brunell, Edward G., et al.

U.S. Appl. No. 12/971,544, filed Dec. 17, 2010, Brunell, Edward G., et al.

U.S. Appl. No. 13/094,701, filed Apr. 26, 2011, Brunell, Edward G., et al.

U.S. Appl. No. 13/094,811, filed Apr. 26, 2011, Brunell, Edward G., et al.

U.S. Appl. No. 13/094,560, filed Apr. 26, 2011, Brunell, Edward G., et al.

"PCT Application No. PCT/US10/41112 International Search Report", Sep. 2, 2010 , 11 pages.

"PCT Application No. PCT/US10/43886 International Search Report", Sep. 16, 2010 , 12 pages.

U.S. Appl. No. 13/109,427, filed May 17, 2011, Brunell, Ed et al.

"U.S. Appl. No. 13/094,560 Office Action", Mar. 30, 2012 , 13 pages.

"U.S. Appl. No. 13/094,701 Office Action", Mar. 27, 2012 , 26 pages.

"U.S. Appl. No. 13/094,811 Office Action", Apr. 3, 2012 , 16 pages.

"U.S. Appl. No. 12/965,749 Office Action", Nov. 8, 2012 , 30 pages.

"U.S. Appl. No. 12/971,544 Office Action", Nov. 6, 2012 , 43 pages.

"U.S. Appl. No. 13/094,701 Final Office Action", Nov. 28, 2012 , 14 pages.

"U.S. Appl. No. 12/965,749 Final Office Action", Apr. 22, 2013, 30 pages.

"U.S. Appl. No. 12/971,544 Final Office Action", Mar. 14, 2013, 38 pages.

Gusella, Riccardo et al., "An Election Algorithm for a Distributed Clock Synchronization Program", *Berkley* http://www.eecs.berkeley.edu/Pubs/TechRpts/1986/CSD-86-275.pdf Dec. 1985, 19 pages.

"U.S. Appl. No. 13/094,811 Office Action", Jun. 21, 2013, 19 pages.

* cited by examiner

CONTROLLING SOUND DISTRIBUTION IN WAGERING GAME APPLICATIONS

RELATED APPLICATIONS

This application claims the priority benefit of U.S. Provisional Application Ser. No. 61/235,518 filed Aug. 20, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, control sound distribution in wagering game applications.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
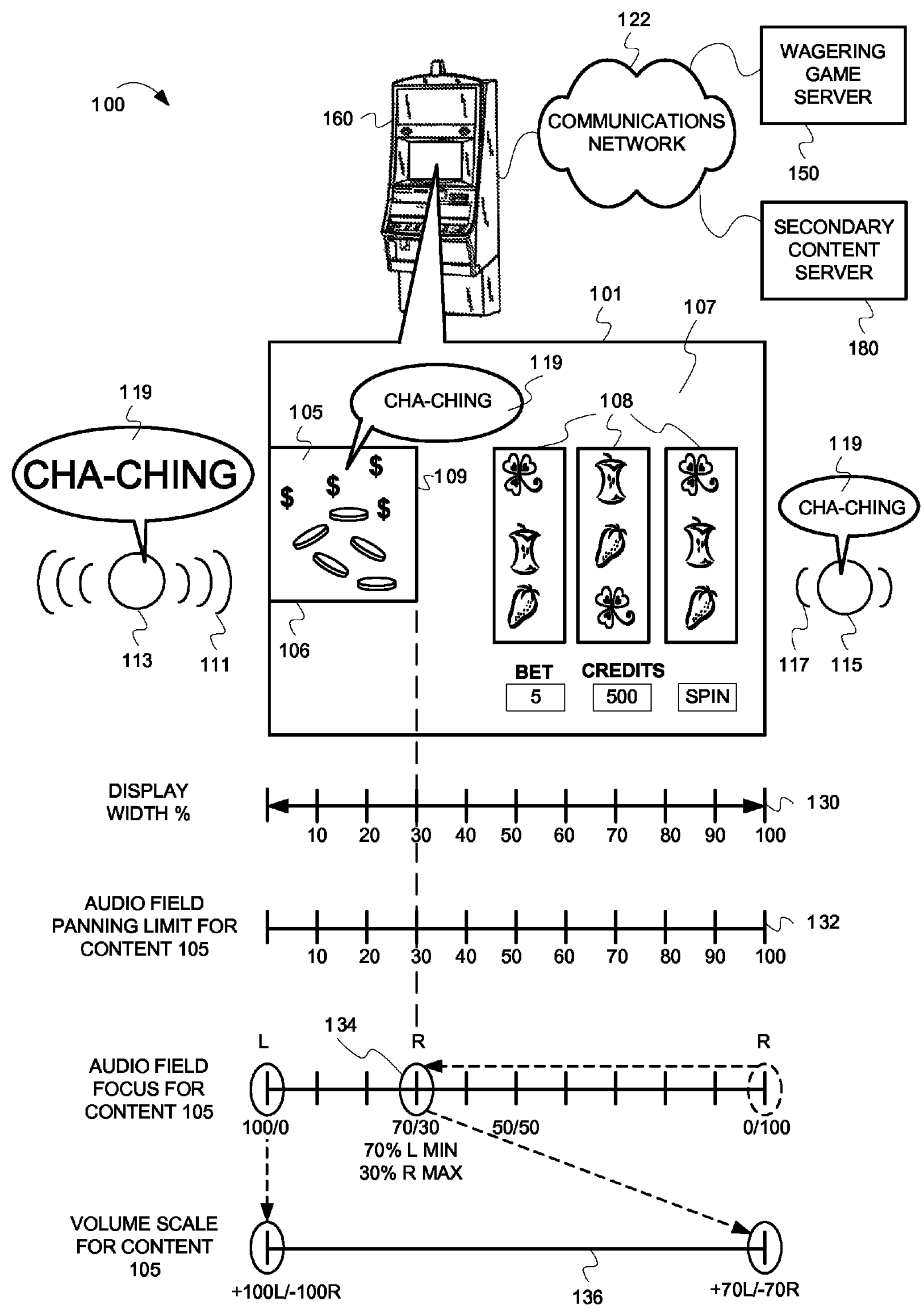
FIG. 1 is an illustration of controlling audio panning for wagering game applications based on window location, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

INTRODUCTION

This section provides an introduction to some embodiments.

Many computerized wagering game systems have a variety of sound and graphical elements designed to attract and keep a game player's attention, such as sound effects, music, and animation. These game presentation features often include a variety of music, sound effects, and voices presented to complement a visual (e.g., video, computer animated, mechanical, etc.) presentation of the wagering game on a display (e.g., a monitor screen, a computer desktop, a computerized display background, etc.). Often, multiple gaming applications run on a wagering game machine. The multiple gaming applications can compete for sound resources, fighting for the foreground. For example, a main, or primary game application ("primary game") can be running on a wagering game machine. At the same time a secondary game application ("secondary game") can also be presented on the wagering game machine. The secondary game may present content ("secondary content") in a graphical interface (e.g., a graphical user interface, a window, a utility panel, a widget, a button panel, a game panel, a flash animation object, a visual object, a toolbar, etc.) that may be off-centered on the wagering game machine display (e.g., docked to one side of a display, offset to the left-hand side of the screen, etc.). The primary game may also present content, which may or may not be centered on the screen. Thus, the primary game and secondary game may present content that appears with different visual characteristics (e.g. different locations) on the wagering game machine's display, thus enhancing a player's experience by presenting multiple content at the same time in interesting visual configurations. The sound from each game application, however, may not be as interesting. Quite often sound is one of the least developed portions of a wagering game, though it can provide as equally powerful an impact on the player as visual characteristics.

Some embodiments of the present subject matter, however, describe examples of controlling sound distribution in wagering game applications based on visual characteristics of content and content containers. Some embodiments of controlling sound distribution in wagering games may include examples of gaming applications in a casino network, using wagering game machines. Other embodiments may include examples of network wagering venues (e.g., an online casino, a wagering game website, a wagering network, etc.). Embodiments can be presented over any type of communications network (e.g., public or private) that provides access to wagering games such as a website (e.g., via wide-area-networks, or WANs), a private gaming network (e.g., local-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

As mentioned previously, some embodiments include examples of controlling sound distribution in wagering game applications based on visual characteristics of content and content containers. For example, FIG. 1 illustrates an example of controlling sound distribution based on a visible location of a graphical interface for the content, such as a window, or other similar container-type object, that confines the content to a physical location on an overall display area.

FIG. 1 is a conceptual diagram that illustrates an example of controlling audio panning for wagering game applications based on window location, according to some embodiments. In FIG. 1, a wagering game system ("system") 100 includes a wagering game machine 160 connected to a wagering game server 150 via a communications network 122. The wagering game server 150 can provide main wagering game content ("primary content") 107, such as reels 108. Also connected to the communications network 122 is a secondary content server 180. The secondary content server 180 can provide additional content ("secondary content") 105, including both wagering and non-wagering content, such as secondary wagering games, advertisements, account information, etc. The system 100 can control (e.g., restrict, limit, focus, etc.) an aural presence (e.g., audio fields 111, 117) for the secondary content 105 within an area around the wagering game machine 160 that represents the geometry of a graphical interface window ("window") 106 that contains the secondary content 105. For instance, the system 100 focuses the audio fields 111, 117 in a way that approximates, or represents, a location of one or more boundaries (e.g., right-side boundary 109) of the window 106 in relation to a shape, size, boundary, position, dimension, or other visual characteristics of a display 101. For instance, the system 100 can determine a display width 130 for the display 101, and can set or control a panning limit 132 for the audio fields 111, 117. The system 100 can utilize the panning limit 132 to determine an audio-field focus setting ("focus setting") 134, which the system 100 can utilize to determine a volume scale 136. The system 100 can utilize the volume scale 136 to control sound intensity for the secondary content 105 at multiple sound production devices (e.g., left speaker 113 and right speaker 115). The sound intensity at the left speaker 113 and the right speaker 115, control the audio fields around the wagering game machine 160, which produces a sound for the secondary content 105 that seems to come more from the left speaker 113 than from the right speaker 115. The system 100 produces an unbalanced sound so that the amount of sound that comes from the left speaker 113, for the secondary content 105, feels more to the left because the window 106 is more to the left-hand side of the display 101. For example, if the right-side boundary 109 is approximately at 30% of the display width 130, then the system 100 sets the panning limit 132 so that an overall audio field (e.g., the combination of audio fields 111, 117) will appear to be mostly to the left-hand side of the wagering game machine 160 (e.g., sound volume of sound effect 119 is set at a minimum of 70% on the left speaker 113, sound volume of sound effect 119 set at a maximum of 30% on the right speaker 115).

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
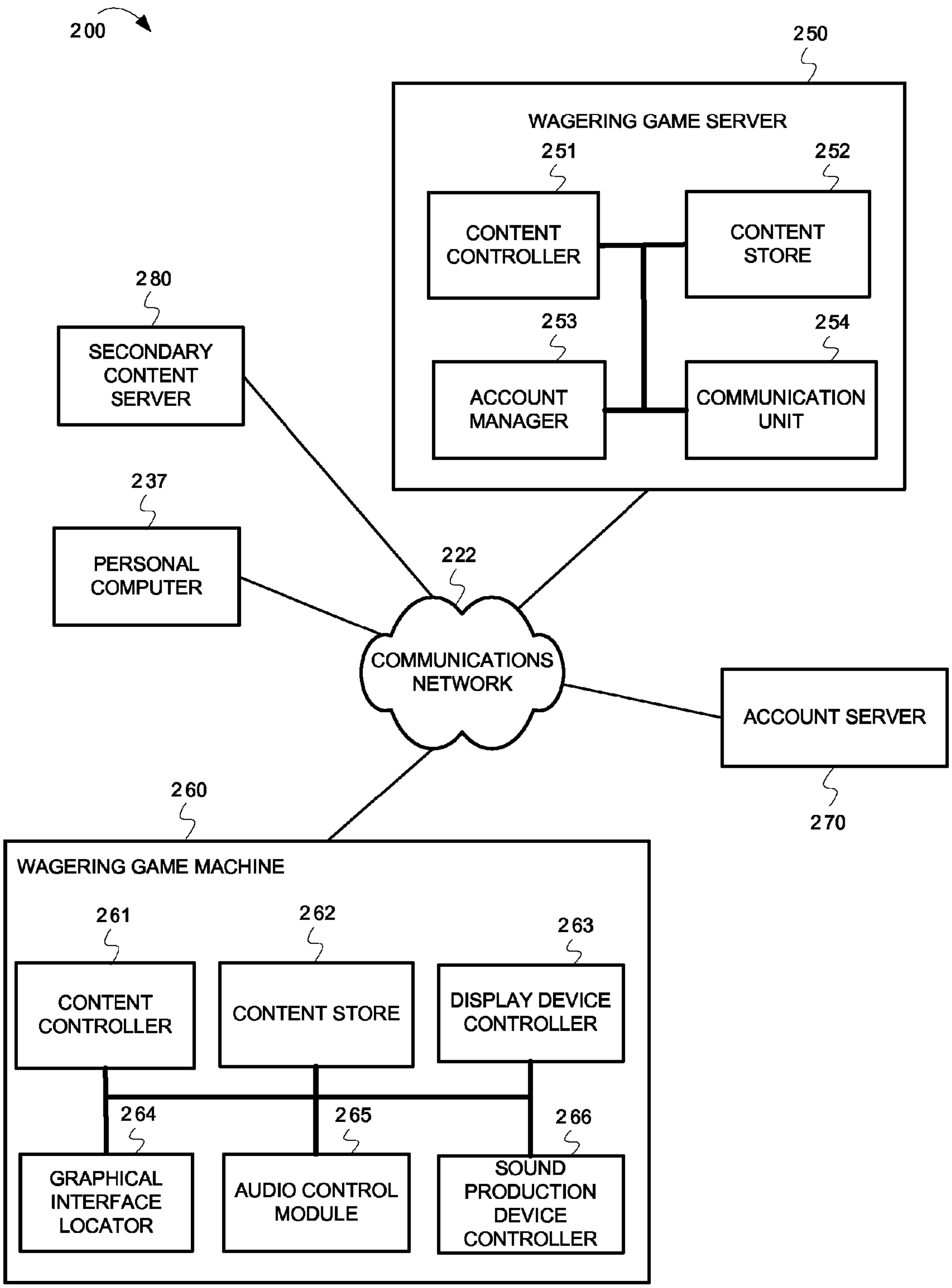
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store wagering game player account information, such as account settings, preferences, player profile data, and other information for a player. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. In some embodiments, the wagering game server 250 may be referred to as a primary content server or primary wagering game server.

The wagering game system architecture 200 can also include the wagering game machine 260 configured to present wagering games and receive and transmit information to control sound distribution in wagering games. The wagering game machine 260 can include a content controller 261 configured to manage and control content and presentation of content on the wagering game machine 260. The wagering game machine 260 can also include a content store 262 configured to contain content to present on the wagering game machine 260. The wagering game machine 260 can also include a display device controller 263 configured to present content on a display device associated with the wagering game machine 260. The display device controller 263 can also determine display dimensions for a display device, such as a computer monitor, a wagering game machine display screen, etc. The wagering game machine 260 can also include a graphical interface locator 264 configured to determine a visible characteristic, such as a location of a graphical interface, which presents wagering game content. The wagering game machine 260 can also include an audio control module 265 configured to modify sound distribution (e.g., panning of sound, sound volume, sound balance) between multiple sound production devices based on the graphical interface's visible characteristic (e.g., the location of the graphical interface) in relation to visible characteristics (e.g., display dimensions, a screen size, a desktop resolution, etc.) for a display device that presents the graphical interface. The audio control module 265 can also dynamically determine changes to a graphical interface's location, and other factors (e.g., content movement, player movement, client configuration changes, etc.), and dynamically adjust the sound distribution. The wagering game machine 260 can also include a sound production device controller 266 configured to control sound at multiple sound-production devices (e.g., speakers).

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interface), thus becoming, or falling under the control of, primary content or primary applications, and vice versa.

Each component shown in the wagering game system architecture 200 is shown as a separate and distinct element connected via a communications network 222. However, some functions performed by one component could be performed by other components. For example, the wagering game server 250 can also be configured to perform functions of the display device controller 263, the graphical interface locator 264, the audio control module 265, the sound production device controller 266, and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machine 260 can take the form of floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc. The wagering game machine 260 can be associated with (e.g., include, be accessible to, be connected to, configured to communicate with, etc.) a computer system, a personal digital assistant (PDA), a cell phone, a laptop, or any other device or machine that is capable of processing information, instructions, or other data provided via the communications network 222. In some embodiments, the wagering game system architecture 200 can include a personal computer 237 in addition to and/or in place of, the wagering game machine 260.

In some embodiments, wagering game machine and wagering game servers work together such that the wagering game machine can be operated as a thin, thick, or intermediate client. For example, one or more elements of game play may be controlled by the wagering game machine or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the server can provide functionality that is not directly related to game play. For example, account transactions and account rules may be managed centrally (e.g., by the server) or locally (e.g., by the client). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein. Machine-readable storage media includes any mechanism that stores information in a form readable by a machine (e.g., a wagering game machine, computer, etc.). For example, machine-readable storage media includes read only memory (ROM), random access memory (RAM), magnetic disk storage media, optical storage media, flash memory machines, etc. Some embodiments of the invention can also include machine-readable signal media, such as any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
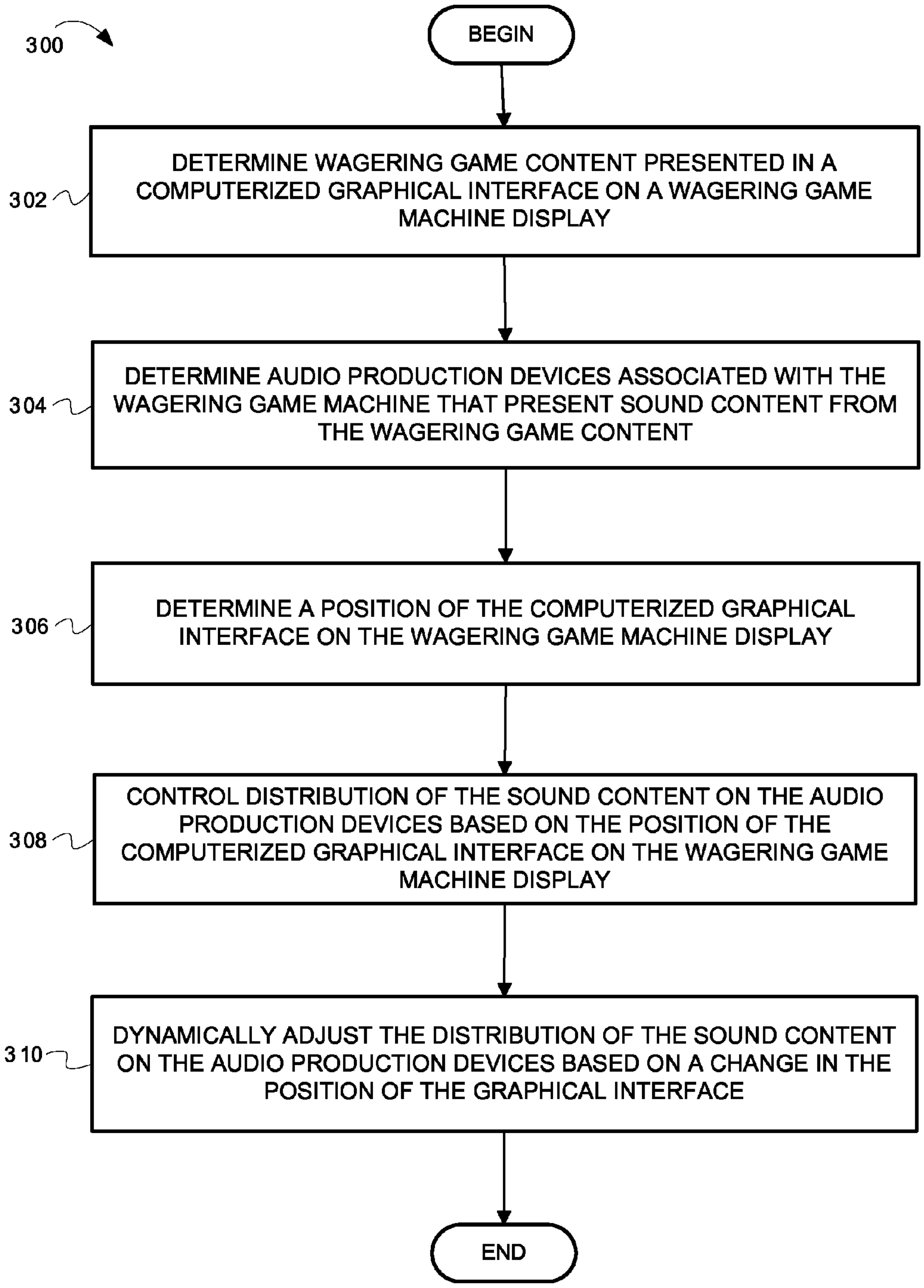
FIG. 3 is a flow diagram 300 illustrating distributing multi-source sound for gaming applications, according to some embodiments.
Figure 4:
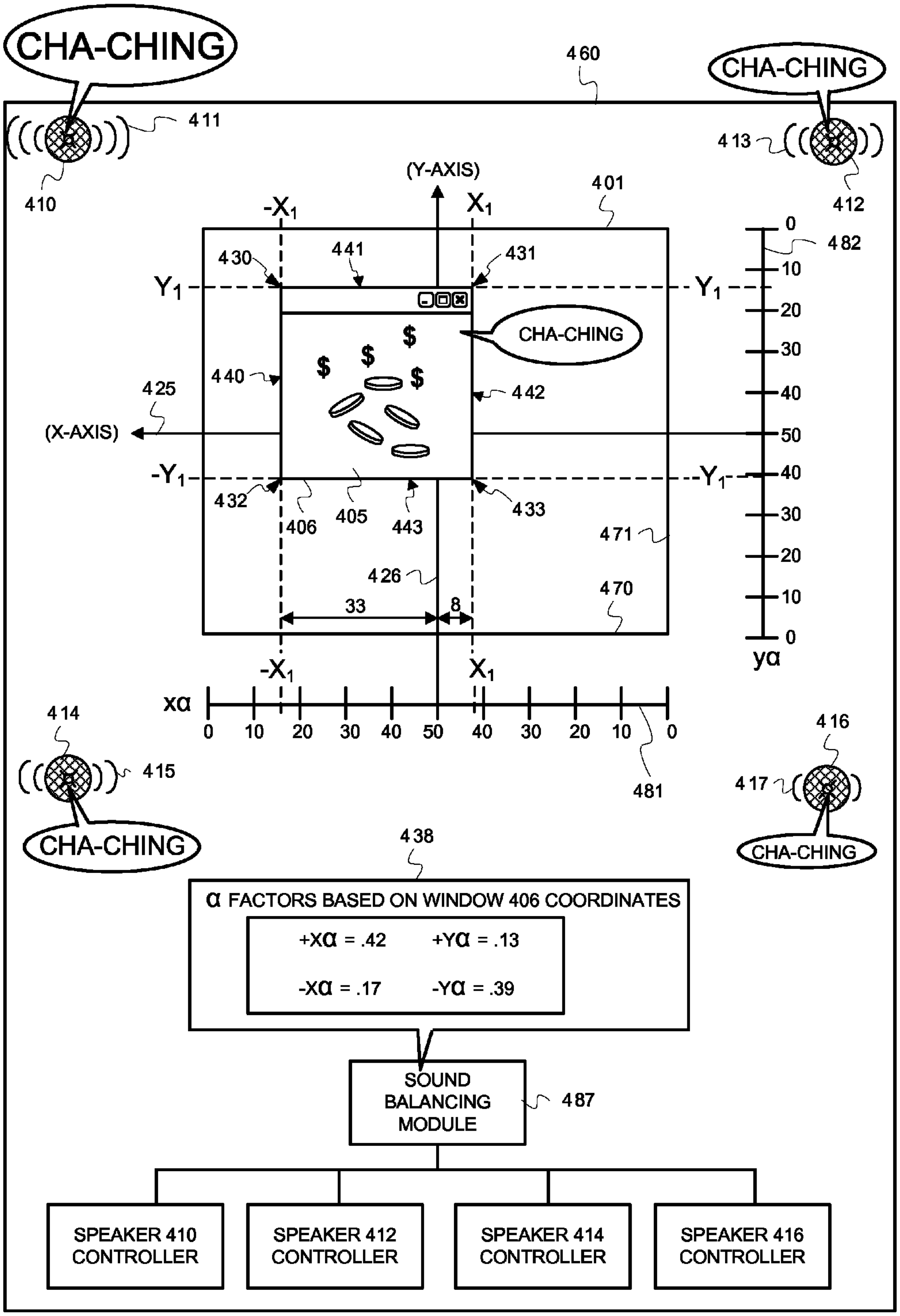
FIG. 4 is an illustration of controlling multi-source audio distribution based on window coordinates, according to some embodiments.

FIG. 3 is a flow diagram ("flow") 300 illustrating distributing multi-source sound for gaming applications, according to some embodiments. FIGS. 1, 4, 5, and 6 are conceptual diagrams that help illustrate the flow of FIG. 3, according to some embodiments. This description will present FIG. 3 in concert with FIGS. 1, 4, 5 and 6. In FIG. 3, the flow 300 begins at processing block 302, where a wagering game system ("system") determines wagering game content presented in a computerized graphical interface ("graphical interface") on a wagering game machine display. The display may be part of an electronic display device, such as a video monitor, a flat-panel display, an LED screen, etc. The display device may be built into the wagering game machine or may be a peripheral device associated with the wagering game machine, such as a video monitor connected to a docking station. The system can present the display using software stored on the wagering game machine that presents visual images and controls the positions of the images. For instance, the wagering game machine may be configured with an operating system that tracks the positions and sizes of application graphical interfaces, such as panels, windows, frames, forms, etc. The graphical interfaces have structural characteristics, geometric properties, reference points, and/or other data, which define the graphical interface's spatial relationships to each other and other system objects, including to structural characteristics, geometric properties, reference points, etc., of the display. The structural characteristics, geometric properties, reference points, and other data may include information that the system can use to present a boundary, a mid-point, a corner, an anchor, a border, a handle, a coordinate point, a grid, a layer, a scroll-bar, a control, or other parts of a graphical interface on the display. In one embodiment, the system can determine graphical interface boundaries that constitute a graphical interface area. The system can also determine display boundaries that constitute a display area. For example, in FIG. 1, the graphical interface window ("window") 106 includes a border that confines the secondary content 105 to the window 106. The border has four sides, or boundaries including, two vertical boundaries (i.e., a top-side boundary and bottom-side boundary) and two horizontal boundaries (i.e., a left-side boundary and the right-side boundary 109). Each of the four boundaries can be defined by a coordinate line on the display 101. FIG. 4 illustrates another example of a window 406 on a display 401 of a wagering game machine 460. The display 401 is associated with a coordinate grid. Specifically, the coordinate grid includes coordinates for individual points (e.g., pixels) on the display 401. The wagering game machine 460 can utilize any type of coordinate tracking or graphing systems, but, for exemplary purposes, FIG. 4 illustrates a Cartesian coordinate system with tangential X and Y coordinate reference axes (i.e., x-axis 425 and y-axis 426) that intersect at a common center point. The y-axis 426 represents a central coordinate divider for a width of the display 401. The x-axis 425 represents a central coordinate divider for the height of the display 401. It should be noted that while some embodiments refer to "central" coordinate dividers and "central" points of reference for a display boundary, other embodiments can utilize other reference elements of a display boundary, such as a corner point, a border origin line, etc. The wagering game machine 460 can also have multiple speakers 410, 412, 414, and 416. The multiple speakers 410, 412, 414 and 416 can produce a multi-source sound for sound producing content ("content") 405 within the window 406. The wagering game machine 460 can balance the sound between the multiple speakers 410, 412, 414, and 416 in a way that correlates with the dimensions of the display 401. For instance, speaker 410 can produce an audio field 411 predominantly representative of the coordinates for the upper left-hand region, or quadrant, of the display 401 (i.e., –X and +Y coordinates). Likewise, speaker 412 can produce a audio field 413 predominantly representative of the coordinates for the upper right-hand quadrant of the display 401 (i.e., +X and +Y coordinates), speaker 414 can produce a audio field 415 predominantly representative of the coordinates in the lower left-hand quadrant of the display 401 (i.e., –X and –Y coordinates), and speaker 416 can produce a audio field 417 predominantly representative of the coordinates in the lower right-hand quadrant of the display 401 (i.e., +X and –Y coordinates). In some embodiments, the wagering game machine 460 may have a hardware configuration that presents content in a three-dimensional gaming environment (e.g., peripheral display devices that wrap around a player, surround sound speakers in front of and behind a player, etc.). The wagering game machine 460 may, in such embodiments, utilize a third axis (e.g., a depth coordinate axis, or z-axis) to represent visual and sound effect depth. The window 406 has four corners 430, 431, 432, and 433 and four boundaries 440, 441, 442, and 443 that make up a window area. The window area covers only a portion of the display area and can be in a non-centered position on the display 401. The four boundaries 440, 441, 442, 443 confine the content 405 to the window area. The content 405 can include game objects, advertisement animations, videos, wagering game objects, game assets, advertising objects, wagering game related activity, secondary game activity, advertising activity, etc.

The flow 300 continues at processing block 304, where the system determines audio production devices associated with the wagering game machine that present sound content from the wagering game content. The audio production devices are positioned in relation to the display to produce a multi-source and/or multi-directional sound from the audio production devices for the sound producing content. The audio production devices can be speakers, woofers, sound reflection devices, musical instruments, or any other sound generation, reflection, or transmission devices. The multi-source and/or multi-directional sound streams from the audio production devices according to sound commands associated with the sound content and/or sound settings associated with the wagering game machine (e.g., sound system settings). The system uses the sound commands to present differences in sound distribution factors, such as sound properties and sound reproduction characteristics from the audio production devices. Sound distribution factors can include balance, pan, movement, delay, timing, frequency, directionality, reverberation, volume, equalization, flanging, dynamics, dynamic range, panoramic position, fading, roll-off, etc. For example, in some embodiments, the system can adjust audio "pan" or "panning" Audio pan may include the spreading of a monaural signal in a stereo or multi-channel audio field. Audio pan control can include modifying volume levels, adding reverberations, adjusting sound timing, etc. to create the impression that a source is moving around a soundstage (e.g., from one side of a wagering game machine to another). Soundstages can be designed for an application and the application can produce sound commands for its own sound space to generate the multi-source sound. The sound commands are preconfigured with sound production configurations that distribute the multi-source sound between the plurality of audio production devices in relation to a position of an active sound producing content (e.g., sound producing wagering game objects) within the graphical interface area.

Figure 5:
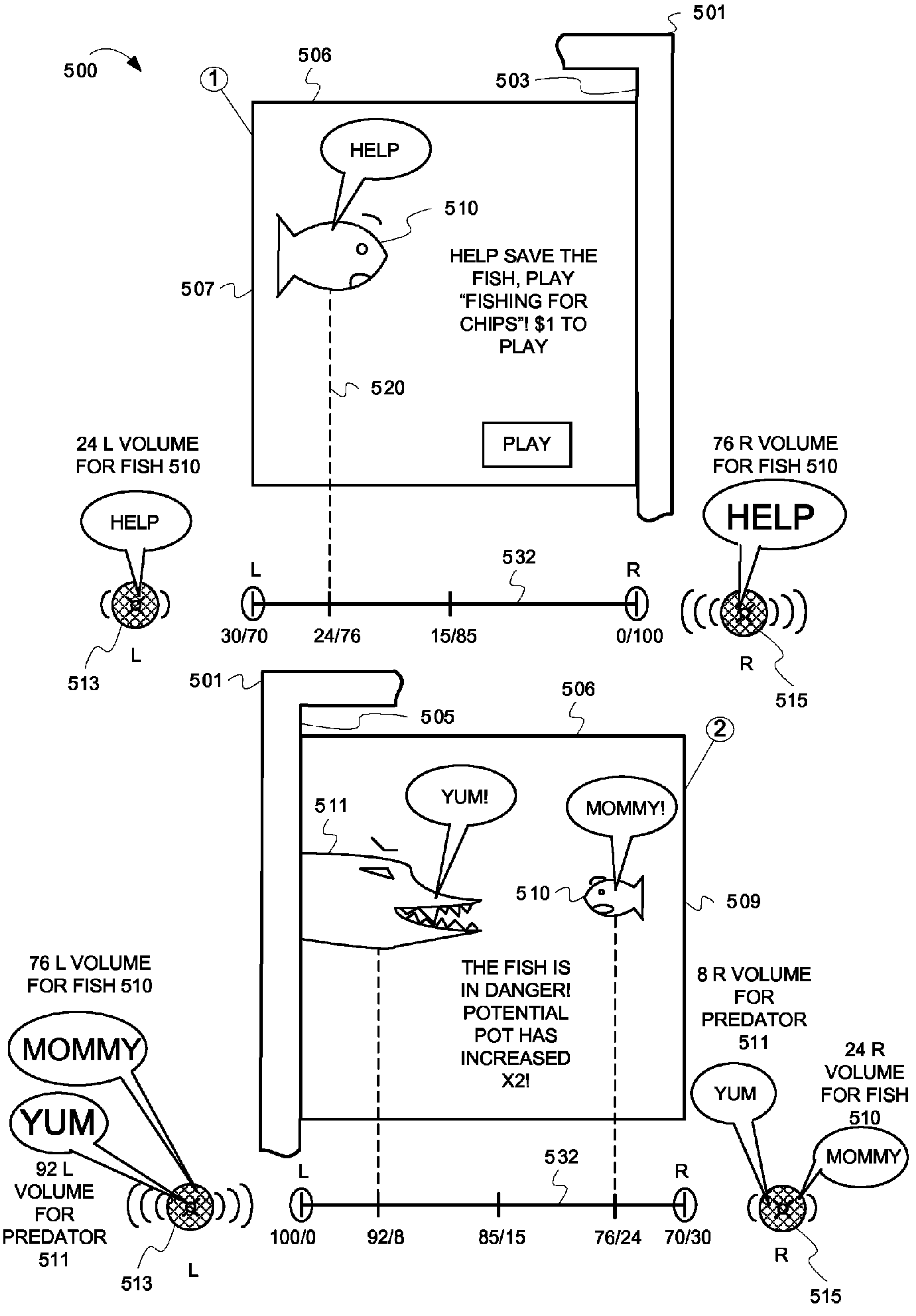
FIG. 5 is an illustration of dynamically adjusting audio panning limits for window movement and content activity, according to some embodiments.
Figure 6:
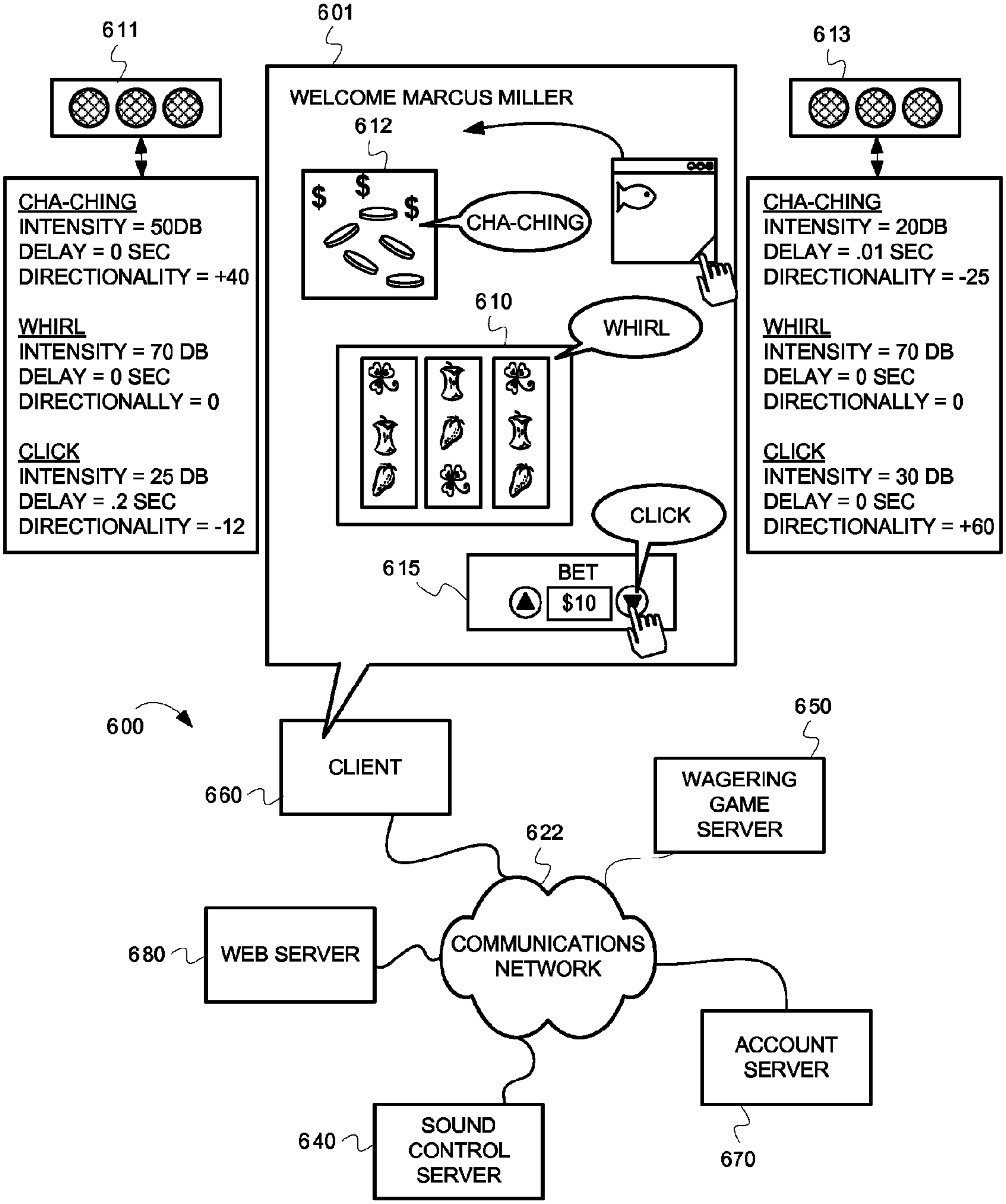
FIG. 6 is an illustration of controlling sound balancing for wagering game systems, according to some embodiments.

The flow 300 continues at processing block 306, where the system determines a position of the graphical interface on the wagering game machine display. The system can compare a structural or geometric characteristic of a graphical interface, such as a window boundary, to a structural or geometric characteristic of the display, such as a boundary of the display. The system can determine a spatial relationship value that defines a comparative position between the graphical interface characteristic and the display device characteristics. The system can use coordinates as spatial relationship values. For instance, in FIG. 1 the system 100 can utilize coordinates values for the right-side boundary 109 to determine a relative position of the window 106 to the boundaries of the display 101. In some embodiments, as in FIG. 4, the wagering game machine 460 can use coordinate values associated with all of the four boundaries 440, 441, 442, and 443 to determine the relative position of the window 406 to the boundaries of the display 401. In some embodiments, the area of the window 406 is less than the size of the display 401 so that the four boundaries 440, 441, 442 and 443 can be positioned in different positions relative to the display (e.g., can move around the space provided by the display 401, can be offset to appear or reside in different regions of the display 401, can be docked or anchored to characteristics within the area of the display 401, etc.). The wagering game machine 460 can obtain coordinate values, and/or other geometry and visual field information, from an application that runs within the window 406, from a wagering game machine operating system, or from other applications or services. The four boundaries 440, 441, 442, 443 each have coordinate values with a fixed value in relation to at least one of the boundaries for the display 401. For example, a right-side boundary 442 has a fixed value (e.g., X1 coordinate value) on the x-axis 425. The X1 coordinate value, when followed in a direct line downward, tangentially intersects a bottom display boundary 470 at a point that correlates with the same X1 coordinate value on the bottom display boundary 470. The bottom display boundary 470 has a distance along a dimensional width of the display 401. The wagering game machine 460 compares the x-coordinate value to a width scale 481 that represents the width of the display 401 divided into 100 scale units. The y-axis 426 represents a center point on the width scale 481. The wagering game machine 460 determines that the X1 value is approximately eight scale units (of the width scale 481) to the right of the y-axis 426. The wagering game machine 460 can also determine that a left-side boundary 440 has a fixed value (e.g., –X1, wherein the minus value represents a position in the negative domain of the x,y coordinate scale, or, in other words, a value to the left of the central y-axis 426). The –X1 value also correlates with a same –X1 value on the bottom display boundary 470, which is approximately 33 scale units (of the width scale 481) to the left of the y-axis 426. Using this information, the wagering game machine 460 can determine the exact positions of the left-side boundary 440 and the right-side boundary 442 of the window 406 relative to the bottom display boundary 470. The wagering game machine 460 can also determine Y coordinate values (e.g., Y1, –Y1) of a top boundary 441 and a bottom boundary 443 in relation to coordinate values on a right-side display boundary 471. The wagering game machine 460 can compare the Y coordinate values to a height scale 482 (e.g., also scaled to 100 scale units, though not necessarily equivalent in value to the scale units for the width scale 481 to adjust for differences in width and height of the display 401). The wagering game machine 460 determines the exact positions of the top boundary 441 and the bottom boundary 443 of the window 406 relative to the right-side display boundary 471. The wagering game machine 460 can use the scaled values to determine the width and height of the window 406 relative to width and height of the display 401. Thus, the wagering game machine 460 can determine the size and position of the window 406 relative to the size and position of the display 401, using height and width measurements and/or coordinate values. In other embodiments, the wagering game machine 460 can use other structural characteristics or reference points of the window 406, other than or in addition to the coordinates of the four boundaries 440, 441, 442, 443, such as the coordinates of the four corners 430, 431, 432, and 433. FIGS. 1 and 5 illustrate other embodiments that use one boundary to determine relative positions instead of four boundaries. For example, in FIG. 1, the window 106 is docked to the left side of the display 101, which represents a far-left boundary value of the display 101, which the system 100 knows. The system 100 can use the coordinate value for the right-side boundary 109 to determine the relative size and/or position of the window 106 to the size and/or position of the display 101 in one dimension, a horizontal dimension. The system 100 only needs to determine relative positions in one dimension because the orientation of the audio production devices (e.g., left speaker 113 and right speaker 115) only presents one dimension of sound (i.e., left to right). In FIG. 5, a wagering game system ("system") 500 determines the position of the window 406 in relation to one dimension (i.e., a width dimension) of a display border 501 based on the docked position of window 506. For example, the window 506, at stage "1" is docked to a right-side boundary 503 of the display border 501. Consequently, the system 500 utilizes a left-side boundary 507 of the window 506 to determine the size and position of the window 506. Further, because the system 500 only has two speakers oriented to represent right and left side sound from a wagering game machine, the system 500 only needs to determine width coordinate values in relation to a display dimension. Processing block 308 below includes further discussion of FIG. 5.

The flow 300 continues at the processing block 308, where the system controls distribution of the sound content on the audio production devices based on the position of the graphical interface on the display. For example, the system can modify distribution of multi-source, multi-directional sound between a plurality of audio production devices based on a position of the graphical interface area in relation to the display area. In some embodiments, the system can use a determined position of a window's boundaries to find a correlated sound modification setting, or parameter, that the system can use to modify the sound and/or set limitations on the sound from the sound content. The system can provide control instructions to control audio fields (e.g., audio loads) on the plurality of audio production devices positioned in relation to a dimension for the display area. The system can use the control instructions to modify sound distribution between the plurality of audio production devices to represent the relative position of the graphical interface to the display dimensions. For example, in FIG. 4, a sound distribution module 487 within the wagering game machine 460 can use the coordinate values of the window 406 to control sound fields 411, 413, 415, 417. The sound distribution module 487 can generate scale values or factors (e.g., a) 438 to distribute sound between the multiple speakers 410, 412, 414, and 416 in a way that correlates with the position of the four boundaries 440, 441, 442, 443, the four corners 430, 431, 432, 433, or any other feature of the window 406 that defines its spatial relationship to the display 401. The sound distribution module 487 can generate an overall audio field (e.g., combination of individual audio fields 411, 413, 415, and 417) that causes the sound from the content 405 to appear distributed between the multiple speakers 410, 412, 414, and 416 in a way that correlates with the position of the window 406 relative to the display 401, so that more sound volume appears to come from some speakers more than others. For instance, the sound distribution module 487 can generate the factors 438 as direct correlates with the scaled coordinate values of the boundary lines X1, −X1, Y1, and −Y1 according to the width scale 481 and the height scale 482. The sound distribution module 487 can attenuate sounds, increase sounds, pan sounds, modify sound directionality, etc., for the content 405 based on the factors 438 to control the sounds in a number of aural field dimensions based on the positioning of the multiple speakers 410, 412, 414, and 416 (e.g., overall audio fields in horizontal and vertical dimensions). The sound distribution module 487 can control audio loads on the multiple speakers 410, 412, 414, and 416 by interfacing with speaker controllers and/or other software and hardware that controls sound for the wagering game machine 460. The sound distribution module 487 can also adjust settings, configurations, and/or other sound parameters that are stored on or accessible to the wagering game machine 460. The sound distribution module 487 distributes more sound to, or makes more sound appear to come from, the speaker 410 because the position of the window 406 is offset to have more of its area in the upper left-hand quadrant of the display 401. The amount of sound distribution can be directly related to the amount of window area offset into a quadrant compared to an amount of offset in an opposing quadrant. The sound distribution module 487 contemporaneously reduces, or ducks, sound in the other speakers 412, 414, and 416 to a degree commensurate with an amount of window area that is offset in the other quadrants. For instance, if the window 406 were centered on the display 401, the sound distribution module 487 would permit the content 405 to play its playlist without limitations and/or without application of the factors 438 to modify the distribution of sound. Thus, if the window 406 were centered, the sound distribution module 487 would not modify the sound effects produced by the playlist sound commands and could cause an equal amount of sound for the content 405 from each of the multiple speakers 410, 412, 414, and 416. However, as the window 406 moves, or is positioned, into other quadrants of the display 401, the sound distribution module 487 modifies sound distribution according to the factors 438, so that the sound distribution represents the location of the window 406 within the display 401. For instance, the sound distribution module 487, can produce more sound from some speakers than other speakers that correlates with an off-set position of the window 406 in relation to a central reference point (e.g., the cross section of the x-axis 425 and the y-axis 426) for the display 401. The multiple speakers 410, 412, 414 and 416 are positioned relative to the display 401 to produce a multi-directional sound for the content 405 relative to regions for the display 401 (e.g., the multiple speakers 410, 412, 414, and 416 produce sounds for the closest quadrants of the display 401). The sound distribution module 487 can pan the multi-directional sound so that more sound comes from a direction (i.e., from a speaker) associated with a given region (e.g., a graphical quadrant) in which the window 406 is positioned.

FIG. 5 illustrates a similar example of distributing sound between speakers 513 and 515 based on the position of the window 506. Additionally, the system 500 distributes sound from the speakers 513, 515 based on the position of objects within the window 506. FIG. 5 illustrates an example of setting a panning limit on a horizontal (e.g., width) content volume scale 532. The window 506 at stage "1" is docked against the right-side boundary 503 and constitutes approximately 30% of the width of a display associated with the display border 501. The system 500 sets a panning limit maximum of 30% for left-pan based on the positioning of the left-side boundary 507. The system 500 can scale the sound volume for content in the window 506 to match the panning limit. The system 500 can adjust sound distribution based on the position of a sound producing object (e.g., fish 510) in addition to the panning limit. For instance, at stage "1" the position of the fish 510 corresponds to a horizontal coordinate value 520. The system 500 can use the horizontal coordinate value 520 to adjust sound distribution based on the relative position of the fish 510 compared to the left-side boundary 507 while also enforcing the panning limit based on the position of the left-side boundary 507 to the display border 501. As a result, the system 500 can adjust the panning of the sound between the speakers 513 and 515 according to the horizontal content volume scale 532. The system 500 adjusts the volume for the fish 510 at a right speaker 515 to have an appropriate volume setting based on the position of the fish 510 within the panning limits (e.g., the volume for the fish 510 is set to a 76 volume setting out of 100). At the same time, the system 500 adjusts the volume for the fish 510 at a left speaker 513 to a volume setting of 24 out of 100.

Returning to FIG. 3, the system can distribute sound in many ways in addition to those already mentioned, including, but not limited to the following:

The system can use head tracking to locate where a player is situated for three-dimensional audio.

The system can utilize audio object location processing to modify sounds to appear to come from a specific location of a window in relation to a display. Audio object location processing can include utilizing a head related transfer function, as described in the United States Patent Application, Publication No. US20080070685, incorporated herein by reference. For example, a head related transfer function, or HTRF, is derived from the way a listener's head, ear, and torso affect the sound that is eventually heard. These head, ear, and torso effects are largely responsible for the listener's ability to determine the direction from which a sound is coming, and can be characterized and applied to sounds to make them sound as though they are coming from directions other than their true source. The head-related transfer function is determined such as by use of preexisting models, or by measuring a dummy head designed to mimic the acoustic behavior of a human head. This function is then applied to a sound signal by use of filters such as digital signal processing filters that shape the frequency response of the sound signal before the signal is routed to a speaker and converted to an acoustic or audible sound signal. The game player then hears a filtered version of the sound having frequency response filtering applied such that the sound appears to come from a location specific to the applied filtering process.

The system can delay the transmission time between left and right speakers to distribute sound. Sound delay can produce a similar effect as volume reduction as it causes an effect of distance of an origin of sound. Therefore, even though sound from speakers may be equal, or only slightly different, in intensity, the directionality can produce an effect to a player that sound appears to come from one direction more than from another.

The system can provide cross-talk cancellation to eliminate cross talk between left and right speakers.

The system can use filtering.

The system can reflect sounds off objects in a room.

The flow 300 continues at processing block 310, where the system dynamically adjusts the distribution of the sound content on the audio production devices based on a change in the position of the graphical interface. For instance, the system dynamically adjusts the distribution of a multi-source or multi-directional sound between a plurality of audio production devices based on a change in the position of a window's reference point in relation to a display's reference point (e.g., a change in the window's vertical boundary coordinate position in relation to the display's horizontal central point). The window can move (e.g., system directed movement, manual movement by end-user, operating-system directed movements, display resolution scale change, etc.) and the system can dynamically determine updated boundaries (e.g., updated coordinates) for the window, and automatically update sound distribution settings and/or effects such as panning limitations, volume scaling, etc. For instance, in FIG. 5, the window 506 may move, or be moved, from the right-side boundary 503 of the display border 501, at stage "1," to a left-side boundary 505 of the display border 501 at stage "2." In some embodiments, the move may be accompanied by a wagering game function related to the priority of gaming data. For example, the system 500 may be programmed, or may read user preferences that indicate, to move windows from the right side of a wagering game machine display screen to the left side of the wagering game machine display based on the value of a secondary game. At stage "1," game content within the window 506 provides a game with a certain expected payout value. However, in time the expected payout values, or other value related factors, may change, such as an amount of time left to participate in a game, a number of players involved in a game, a number of social contacts participating in a game, an availability of a preferred type of game, etc. In some embodiments, the system 500 can determine player preferences for positions of windows. For example, a player account may include settings that indicate that games that meet certain requirements, such as possessing certain characteristics (e.g., certain game types, certain themes, etc.) or experiencing certain conditions (e.g., changes n perceived values, changes in potential award values, etc.) should be positioned on preferred locations of the a display (e.g., secondary game windows whose games are of a certain genre or type should be docked on the left side of a display screen, long-term games that increase in value during a gaming session should be automatically moved and docked on the top side of the display screen, etc.). The system 500, for instance, recognizes that the secondary game within the window 506 increases a potential pot amount, or other reward value. Consequently, in stage "2," the system 500 moves the window 506 to the left side of the display and docks the window 506 to the left-side boundary 505, as a visual indication of the game's perceived value to the player. When the system 500 moves the window 506, the system 500 also dynamically adjusts the sound distribution based on the movement. For instance, the system 500 utilizes a right-side boundary 509 of the window 506 to determine the relative position of the window 506 to the display border 501. If the size of the window 506 remains the same, then the system can invert the previous panning limits and scaling factors for the left side of the display. If the window size changes, however, the system 500 can re-determine the relative position of the window 506 using the location of the right-side boundary 509. The system 500 can also determine whether objects have moved within the window 506 and further adjust panning limits, volume scales, or other sound distribution effects. In stage "2," for instance, the fish 510 moved to the right side of the window 506 and a predator 511 enters the window 506 on the left-hand side of the window 506. The system 500 recognizes the positions of the fish 510 and the predator 511, scales the content volume for the individual objects based on the panning limits, and adjusts sounds for each object at the speakers 513 and 515.

Returning to FIG. 3, the system can also dynamically adjust multi-source sound based on many other factors including changes to machine configurations, movements of a player in relation to a display, movements of the player in relation to audio production devices, changes to sizes of the display, changes of position of graphical interfaces in peripheral display devices, additions of multiple graphical interfaces, changes in shape or sizes of the graphical interface, etc. For example, in FIG. 6, a wagering game system 600 includes a sound control server 640 and a client 660 that can detect changes to positions of gaming windows on a display 601, differences in positions of speakers 611 and 613, player activity, etc. For instance, the client 660 may be a personal computer that receives wagering game web content from a web server 680. The web server 680 is connected to the client 660 and wagering game server 650 via a communications network 622. The display 601 can include a primary game graphical user interface 610, a secondary game graphical user interface 612, a button panel 615, and other graphical interfaces, controls, or other items presented on the display 601. The system 600 can detect when a player account accesses an account server 670 using the client 660. The sound control server 640 can automatically determine configurations about the client 660, including the type of the speakers 611, 613, their position, their capabilities, etc., and automatically adjust sound distribution based on that information. In some embodiments, the system 600 can also determine other speakers and audio production devices that may be connected to a network (e.g., light show hardware, overhead speakers, intercom systems, etc.), that may produce sound from network content. The system 600 can present the network content on network displays that run throughout a casino, or other establishment. The system 600 can control sound distribution from the network speakers based on network content position across one or more of the network displays.

Additional Example Operating Environments

This section describes example operating environments, systems and networks, and presents structural aspects of some embodiments.

Wagering Game Computer System

Figure 7:
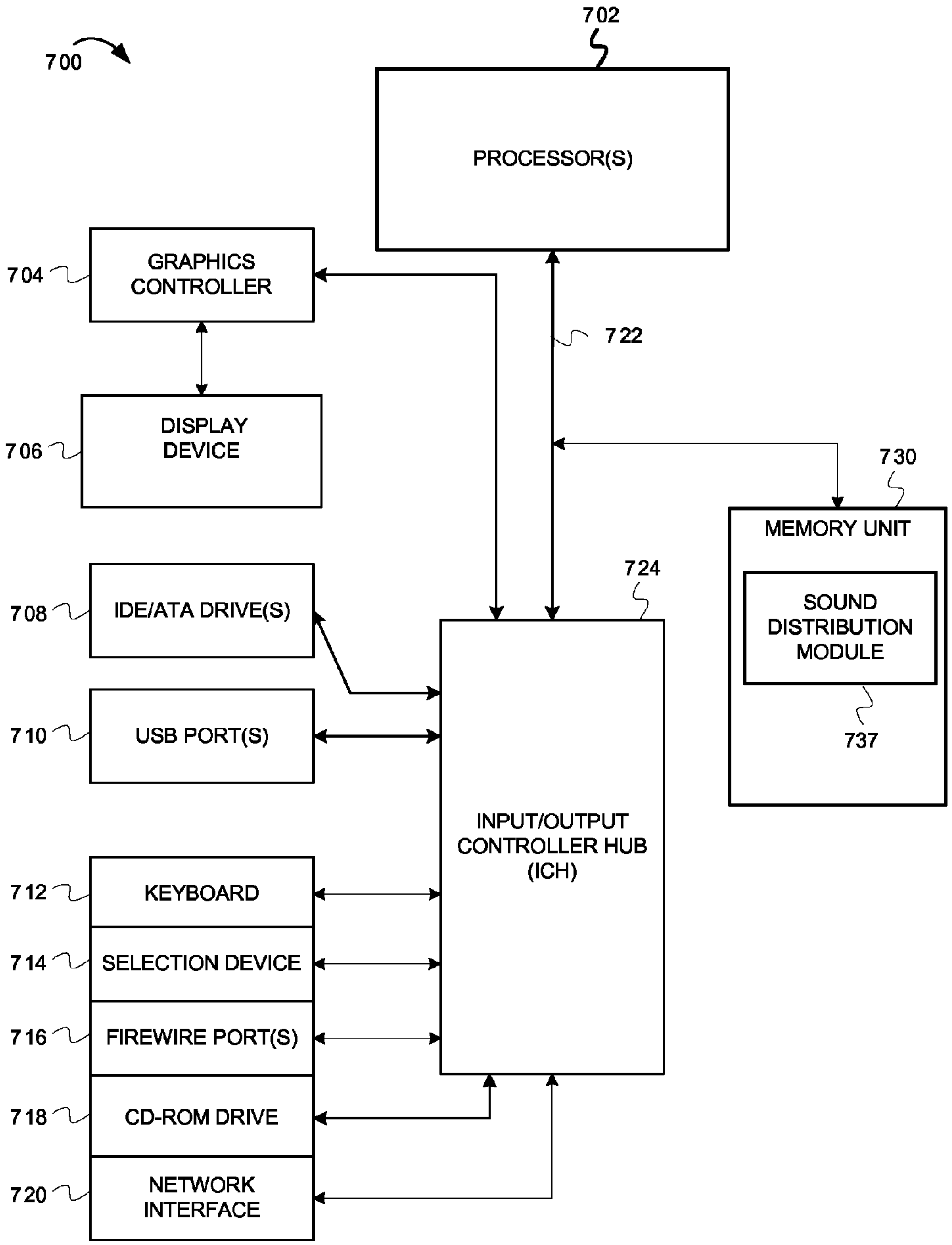
FIG. 7 is an illustration of a wagering game computer system 700, according to some embodiments.

FIG. 7 is a conceptual diagram that illustrates an example of a wagering game computer system 700, according to some embodiments. In FIG. 7, the computer system 700 may include a processor unit 702, a memory unit 730, a processor bus 722, and an Input/Output controller hub (ICH) 724. The processor unit 702, memory unit 730, and ICH 724 may be coupled to the processor bus 722. The processor unit 702 may comprise any suitable processor architecture. The computer system 700 may comprise one, two, three, or more processors, any of which may execute a set of instructions in accordance with some embodiments.

The memory unit 730 may also include an I/O scheduling policy unit 7 and I/O schedulers 7. The memory unit 730 can store data and/or instructions, and may comprise any suitable memory, such as a dynamic random access memory (DRAM), for example. The computer system 700 may also include one or more suitable integrated drive electronics (IDE) drive(s) 708 and/or other suitable storage devices. A graphics controller 704 controls the display of information on a display device 706, according to some embodiments.

The input/output controller hub (ICH) 724 provides an interface to I/O devices or peripheral components for the computer system 700. The ICH 724 may comprise any suitable interface controller to provide for any suitable communication link to the processor unit 702, the memory unit 730, and/or to any suitable device or component in communication with the ICH 724. The ICH 724 can provide suitable arbitration and buffering for each interface.

For one embodiment, the ICH 724 provides an interface to the one or more IDE drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, a selection device 714 (e.g., a mouse, trackball, touchpad, etc.), a CD-ROM drive 718, and one or more suitable devices through one or more firewire ports 716. For one embodiment, the ICH 724 also provides a network interface 720 though which the computer system 700 can communicate with other computers and/or devices.

The computer system 700 may also include a machine-readable storage medium that stores a set of instructions (e.g., software) embodying any one, or all, of the methodologies for control sound distribution in wagering game applications. Furthermore, software can reside, completely or at least partially, within the memory unit 730 and/or within the processor unit 702. The computer system 700 can also include a sound distribution module 737. The sound distribution module 737 can process communications, commands, or other information, to control sound distribution in wagering game applications. Any component of the computer system 700 can be implemented as hardware, firmware, and/or machine-readable storage media including instructions for performing the operations described herein.

Wagering Game Machine Architecture

Figure 8:
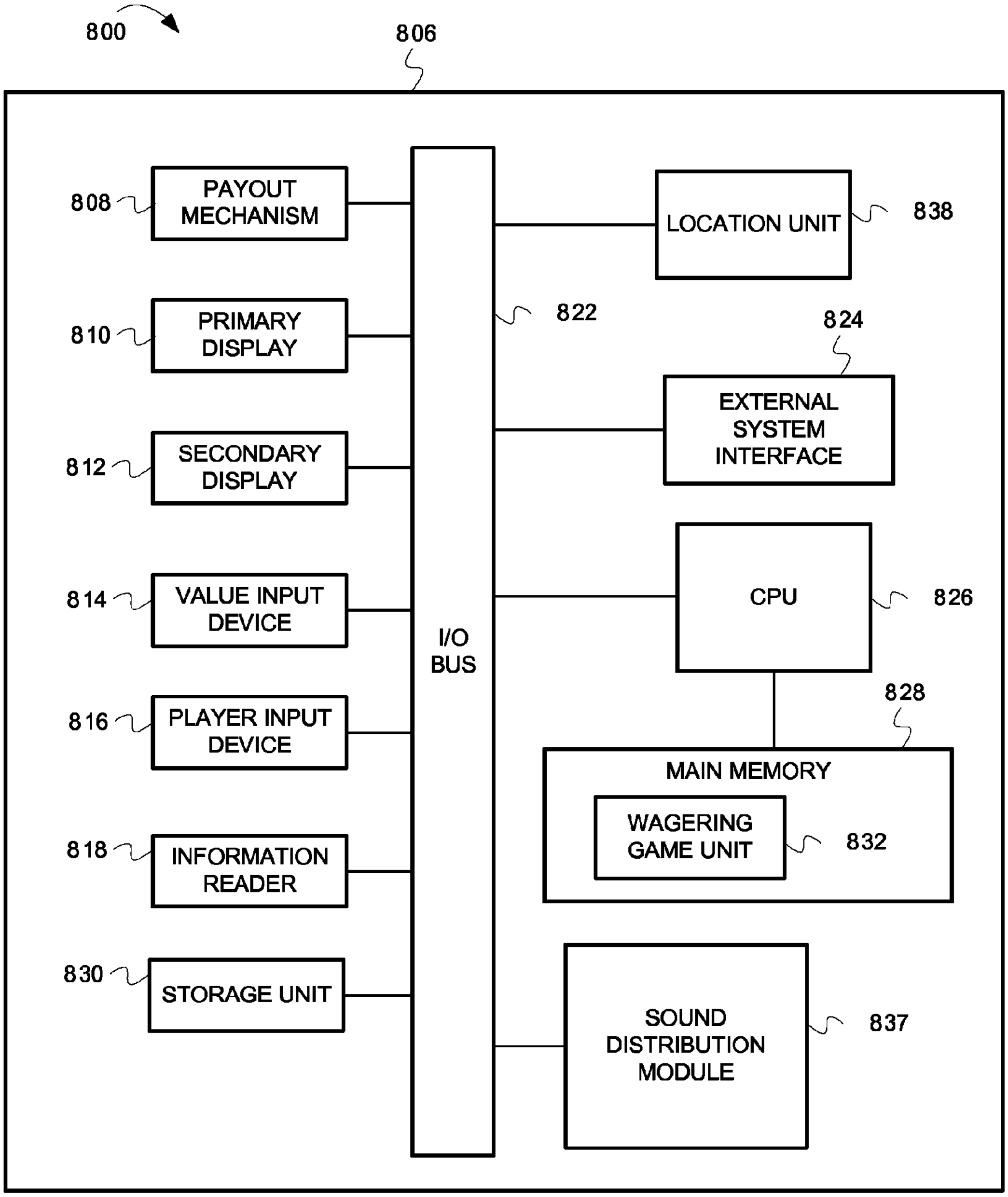
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes a sound distribution module 837. The sound distribution module 837 can process communications, commands, or other information, where the processing can control sound distribution in wagering game applications.

Furthermore, any component of the wagering game machine 806 can include hardware, firmware, and/or machine-readable storage media including instructions for performing the operations described herein.

Mobile Wagering Game Machine

Figure 9:
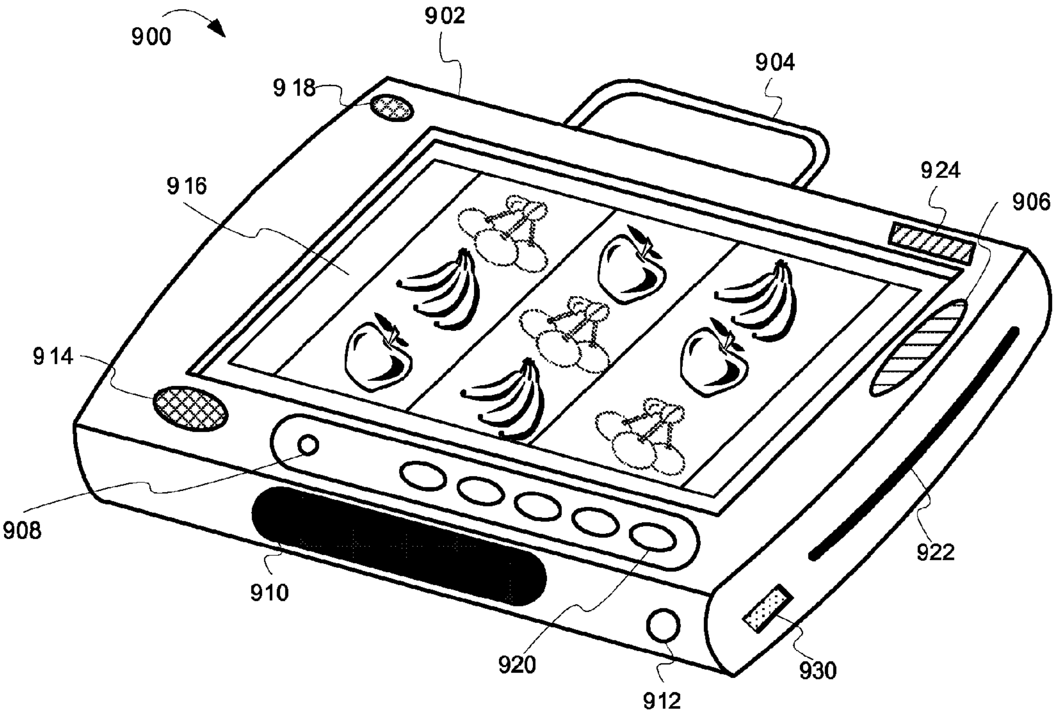
FIG. 9 is an illustration of a mobile wagering game machine 900, according to some embodiments.

FIG. 9 is a conceptual diagram that illustrates an example of a mobile wagering game machine 900, according to some embodiments. In FIG. 9, the mobile wagering game machine 900 includes a housing 902 for containing internal hardware and/or software such as that described above vis-à-vis FIG. 8. In some embodiments, the housing has a form factor similar to a tablet PC, while other embodiments have different form factors. For example, the mobile wagering game machine 900 can exhibit smaller form factors, similar to those associated with personal digital assistants. In some embodiments, a handle 904 is attached to the housing 902. Additionally, the housing can store a foldout stand 910, which can hold the mobile wagering game machine 900 upright or semi-upright on a table or other flat surface.

The mobile wagering game machine 900 includes several input/output devices. In particular, the mobile wagering game machine 900 includes buttons 920, audio jack 908, speaker 914, display 916, biometric device 906, wireless transmission devices (e.g., wireless communication units 912 and 924), microphone 918, and card reader 922. Additionally, the mobile wagering game machine can include tilt, orientation, ambient light, or other environmental sensors.

In some embodiments, the mobile wagering game machine 900 uses the biometric device 906 for authenticating players, whereas it uses the display 916 and the speaker 914 for presenting wagering game results and other information (e.g., credits, progressive jackpots, etc.). The mobile wagering game machine 900 can also present audio through the audio jack 908 or through a wireless link such as Bluetooth.

In some embodiments, the wireless communication unit 912 can include infrared wireless communications technology for receiving wagering game content while docked in a wager gaming station. The wireless communication unit 924 can include an 802.11G transceiver for connecting to and exchanging information with wireless access points. The wireless communication unit 924 can include a Bluetooth transceiver for exchanging information with other Bluetooth enabled devices.

In some embodiments, the mobile wagering game machine 900 is constructed from damage resistant materials, such as polymer plastics. Portions of the mobile wagering game machine 900 can be constructed from non-porous plastics that exhibit antimicrobial qualities. Also, the mobile wagering game machine 900 can be liquid resistant for easy cleaning and sanitization.

In some embodiments, the mobile wagering game machine 900 can also include an input/output ("I/O") port 930 for connecting directly to another device, such as to a peripheral device, a secondary mobile machine, etc. Furthermore, any component of the mobile wagering game machine 900 can include hardware, firmware, and/or machine-readable storage media including instructions for performing the operations described herein.

Wagering Game Machine

Figure 10:
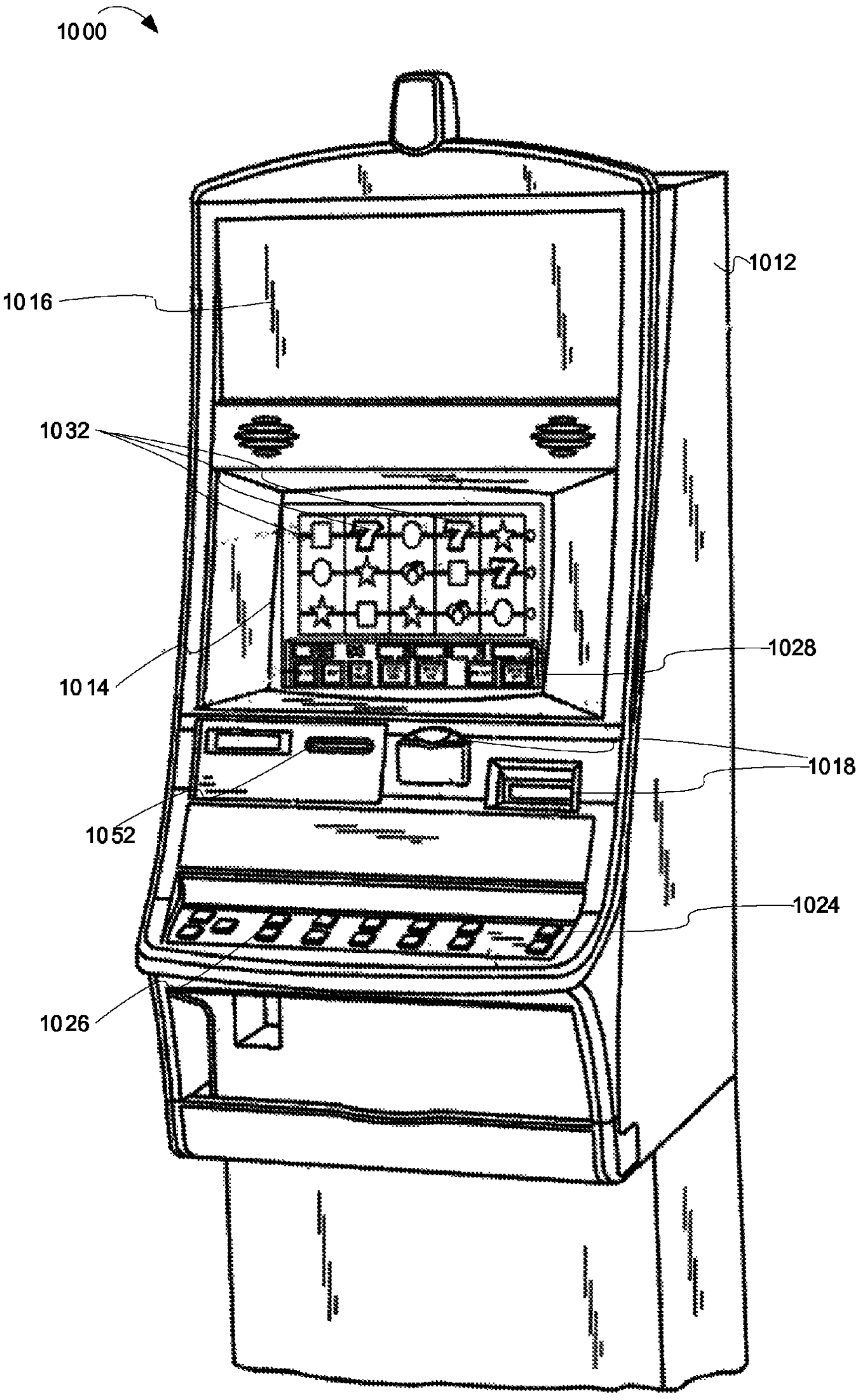
FIG. 10 is an illustration of a wagering game machine 1000, according to some embodiments.

FIG. 10 is a conceptual diagram that illustrates an example of a wagering game machine 1000, according to some embodiments. Referring to FIG. 10, the wagering game machine 1000 can be used in gaming establishments, such as casinos. According to some embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bar top model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a pay line 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal medium, including electrical, optical, acoustical or other form of propagated signal (e.g., carrier waves, infrared signals, digital signals, etc.).

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. One or more non-transitory, machine-readable storage media having instructions stored thereon, which when executed by a set of one or more processors causes the set of one or more processors to perform operations comprising:

determining a position of a computerized graphical interface that is presented on a wagering game machine display associated with a wagering game machine, wherein the computerized graphical interface presents wagering game content;

determining a position of a wagering game object, from the wagering game content, relative to a boundary of the computerized graphical interface;

determining sound content associated with the wagering game object, wherein the sound content is presentable on a plurality of audio production devices associated with the wagering game machine, wherein the audio production devices are configured to present the sound content; and controlling distribution of the sound content on the plurality of audio production devices based on the position of the computerized graphical interface on the wagering game machine display and based on the position of the wagering game object relative to the boundary of the computerized graphical interface.

2. The one or more non-transitory, machine-readable storage media of claim 1, said operations further comprising:

dynamically adjusting the distribution of the sound content on the plurality of audio production devices based on a change in the position of the computerized graphical interface and based on a change in the position of the wagering game object relative to the boundary of the computerized graphical interface.

3. The one or more non-transitory, machine-readable storage media of claim 1, wherein said operation of determining the position of the computerized graphical interface on the wagering game machine display includes operations further comprising:

determining a coordinate position for a graphical interface structural characteristic of the computerized graphical interface;

comparing the coordinate position to a corresponding position on a display boundary for the wagering game machine display; and determining a relative position of the computerized graphical interface to the display boundary location using the coordinate position.

4. The one or more non-transitory, machine-readable storage media of claim 3, wherein the graphical interface structural characteristic comprises one or more of a boundary, a mid-point, a corner, an anchor, a border, a handle, a coordinate point, a grid, a layer, a scroll-bar, and a control.

5. The one or more non-transitory, machine-readable storage media of claim 3, wherein said operation of controlling the distribution of the sound content includes operations further comprising:

associating the coordinate position of the graphical interface structural characteristic to a display dimension scale, wherein the display dimension scale indicates a dimensional measurement for the wagering game machine display;

determining a value on the scale that correlates with the coordinate position;

setting a panning limit that correlates with the value; and controlling sound panning in the plurality of sound production devices based on the panning limit.

6. The one or more non-transitory, machine-readable storage media of claim 3, wherein said operation of determining the coordinate position of the graphical interface structural characteristic of the computerized graphical interface on the wagering game machine display includes operations further comprising:

determining a reference point for an edge of the display boundary of the wagering game machine display;

determining a visual offset amount for the computerized graphical interface, wherein the visual offset amount represents an amount that the computerized graphical interface is offset visually from the reference point for the wagering game machine display; and determining a panning limit for the sound content based on the visual offset amount.

7. The one or more non-transitory, machine-readable storage media of claim 6, wherein the operation of controlling the distribution of the sound content includes operations further comprising:

adjusting sound volume for the sound content to a degree of panning in accordance with the panning limit so that the plurality of audio production devices produce an overall audio field representative of the position of the computerized graphical interface in relation to the reference point for the edge of the display boundary.

8. The one or more non-transitory, machine-readable storage media of claim 1, the operations further comprising:

dynamically adjusting sound parameters for the sound content based on one or more of changes to configurations for the wagering game machine, movement of a player, changes to a resolution of the wagering game machine display, and movement of the computerized graphical interface to a peripheral device.

9. A computer-implemented method comprising:

presenting wagering game content in a content window on a wagering game machine display associated with a wagering game machine;

determining a first structural characteristic for the content window, wherein the first structural characteristic defines a structural portion of the content window;

determining a second structural characteristic for the wagering game machine display, wherein the second structural characteristic defines a structural portion of the wagering game machine display;

comparing locations of the first structural characteristic and the second structural characteristic;

determining a spatial relationship between the content window and the wagering game machine display based on the locations of the first structural characteristic and the second structural characteristic;

controlling sounds from a plurality of wagering game machine speakers based on the spatial relationship; and dynamically adjusting sound parameters for the sounds based on one or more of movement of a player, changes to a resolution of the wagering game machine display, and movement of a computerized graphical interface to a peripheral device.

10. The computer-implemented method of claim 9, wherein the spatial relationship is a relative position between display coordinates of the first structural characteristic and display coordinates of the second structural characteristic defining a window position within the wagering game machine display.

11. The computer-implemented method of claim 9, wherein the controlling includes distributing the sound between the plurality of wagering game machine speakers to represent a position of the content window relative to the wagering game machine display.

12. The computer-implemented method of claim 9 further comprising:

determining a change in position of the content window based on the movement of the first structural characteristic for the content window; and dynamically adjusting sound distribution from the plurality of wagering game machine speakers based on the change in the position of the content window.

13. The computer-implemented method of claim 9 further comprising:

dynamically adjusting sound parameters for the sounds based on one or more of changes to configurations for the wagering game machine display, and an addition of additional sounds from additional content windows.

14. A system comprising:

a display device configured to present a graphical interface, and present wagering game content in the graphical interface;

a plurality of sound production devices configured to present sound content from a plurality of locations positioned around the display device; and an audio control module configured to determine a first position of the graphical interface relative to display dimensions for the display device on which the graphical interface is presented, determine a second position of a wagering game object, from the wagering game content, relative to a structural element of the graphical interface, determine a priority associated with the wagering game object, and modify sound distribution between the plurality of sound production devices based on the first position, the second position, and the priority associated with the wagering game object.

15. The system of claim 14, wherein the audio control module is further configured to modify one or more of sound panning, sound volume, sound balance, and sound direction.

16. The system of claim 14, wherein the audio control module is further configured to correlate the first position of the graphical interface with a scale related to the display dimension, scale the first position to a sound characteristic parameter, and generate sound control instructions to modify sound distribution between the plurality of sound production devices based on the sound characteristic parameter.

17. The system of claim 14, wherein the audio control module is further configured to determine a change in the first position based on movement of the graphical interface within the display device, and dynamically adjust the sound distribution based on the change in the first position.

18. An apparatus comprising:

one or more processors; and a sound distribution module configured to present wagering game content via a computerized graphical window on a computerized wagering game display, determine display dimensions for the computerized wagering game display, determine a relative position of the computerized graphical window to the display dimensions on which the computerized graphical window is presented, present wagering game sound content from a plurality of speakers positioned around the computerized wagering game display, wherein the plurality of speakers are positioned in locations that generate audio fields that represent a position of the computerized graphical window in relation to the display dimensions of the computerized wagering game display, determine that a specific game condition occurs for the wagering game content;

move the computerized graphical window within the computerized wagering game display based on occurrence of the specific game condition, and dynamically distribute the wagering game sound content between the plurality of speakers based on movement of the computerized graphical window relative to the display dimensions.

19. The apparatus of claim 18, wherein the display dimensions represent a wagering game display screen resolution.

20. The apparatus of claim 18, wherein the sound distribution module is further configured to set a panning limit based on the relative position.

21. The apparatus of claim 18, wherein the sound distribution module is further configured to determine a preferred location, specified by a first player setting, to move the computerized graphical window to when the specific game condition occurs, wherein the specific game condition is specified by a second player setting, and wherein prior to occurrence of the specific game condition, the wagering game sound content produced from the plurality of speakers has a balanced sound, move the computerized graphical window to the preferred location such that an area for the computerized graphical window is predominantly located offset from a central reference point on the computerized wagering game display, and dynamically adjust volume for the wagering game sound content to create an unbalanced sound on the plurality of speakers to indicate that the computerized graphical window has moved to the preferred location, wherein the volume for the unbalanced sound correlates with the offset from the central reference point on the computerized wagering game display.

22. The apparatus of claim 18, wherein the specific game condition comprises one or more of a change in priority for the wagering game content, a change in a perceived value setting by the player account for the wagering game content, a change in an expected payout value for the wagering game content, an occurrence of amount of time left to participate in a wagering game, an occurrence of a number of players involved in a wagering game, an occurrence of a number of social contacts participating in a wagering game, an availability of a preferred type of wagering game, a loading of a specific genre of a wagering game, and an occurrence of a potential reward value for a wagering game.

23. An apparatus comprising:

means for determining an off-set position of window in relation to a central reference point for a wagering game machine display, wherein the window is positioned predominantly in a given region of the wagering game machine display;

means for determining sound content associated with wagering game content presented in the window on the wagering game machine display, wherein the sound content is presentable via a plurality of speakers positioned in relation to the wagering game machine display, and wherein the plurality of speakers are configured to produce a multi-directional sound for the wagering game content;

means for moving the window based on a game condition associated with the wagering game content; and means for dynamically adjusting a panning of the multi-directional sound on the plurality of speakers, based on the moving of the window, wherein the dynamically adjusting the panning causes a majority of sound volume for the multi-directional sound to originate from a sound direction associated with the given region in which the window is positioned on the wagering game machine display.

24. The apparatus of claim 23 further comprising:

means for determining a content object position within the wagering game window; and means for additionally panning the multi-directional sound according to the content object position within the wagering game window relative to the position of the wagering game window on the wagering game machine display.

* * * * *